US008505068B2

(12) United States Patent
Patel et al.

(10) Patent No.: US 8,505,068 B2
(45) Date of Patent: Aug. 6, 2013

(54) DERIVING EXPRESS RIGHTS IN PROTECTED CONTENT

(75) Inventors: Tejas D. Patel, Seattle, WA (US); Gregory Kostal, Kirkland, WA (US); Yuhui Zhong, Sammamish, WA (US); Vladimir Yarmolenko, Duvall, WA (US); Pankaj Mohan Kamat, Kirkland, WA (US); Krassimir E. Karamfilov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 12/893,786

(22) Filed: Sep. 29, 2010

(65) Prior Publication Data

US 2012/0079557 A1    Mar. 29, 2012

(51) Int. Cl.
*H04L 29/06* (2006.01)
(52) U.S. Cl.
CPC .................................. *H04L 63/20* (2013.01)
USPC ............................................................ 726/1
(58) Field of Classification Search
CPC .............................. H04L 63/20; H04L 63/102
USPC ............................................................ 726/1
See application file for complete search history.

(56) References Cited

U.S. PATENT DOCUMENTS

| | | | |
|---|---|---|---|
| 5,504,814 A | 4/1996 | Miyahara | |
| 7,353,402 B2 | 4/2008 | Bourne et al. | |
| 7,526,812 B2 | 4/2009 | DeYong | |
| 2005/0021995 A1* | 1/2005 | Lal et al. | 713/200 |
| 2006/0048224 A1 | 3/2006 | Duncan | |
| 2007/0143603 A1 | 6/2007 | Hadden | |
| 2007/0199068 A1 | 8/2007 | Russinovich | |
| 2008/0027868 A1* | 1/2008 | Ljung et al. | 705/51 |
| 2008/0082827 A1 | 4/2008 | Agrawal | |
| 2008/0235807 A1* | 9/2008 | Cross et al. | 726/27 |
| 2009/0192942 A1 | 7/2009 | Cottrille | |

OTHER PUBLICATIONS

Government of South Australia, "Digital Rights Management—Implications for Recordkeeping", Aug. 28, 2009, 7 pages.
Li, Ninghui, et al., "Usable Mandatory Integrity Protection for Operating Systems", 2007, 15 pages.

* cited by examiner

*Primary Examiner* — William Goodchild
(74) *Attorney, Agent, or Firm* — Workman Nydegger

(57) ABSTRACT

The present invention extends to methods, systems, and computer program products for deriving express rights in protected content. Embodiments of the invention provide mechanisms to convert implicit rights to express rights for entities, including applications, inside and outside of an organizational (e.g., enterprise) boundary. The conversion can occur dynamically, based on the information protection policies defined by a policy administrator, granting entities express access to perform tasks on protected content.

20 Claims, 9 Drawing Sheets

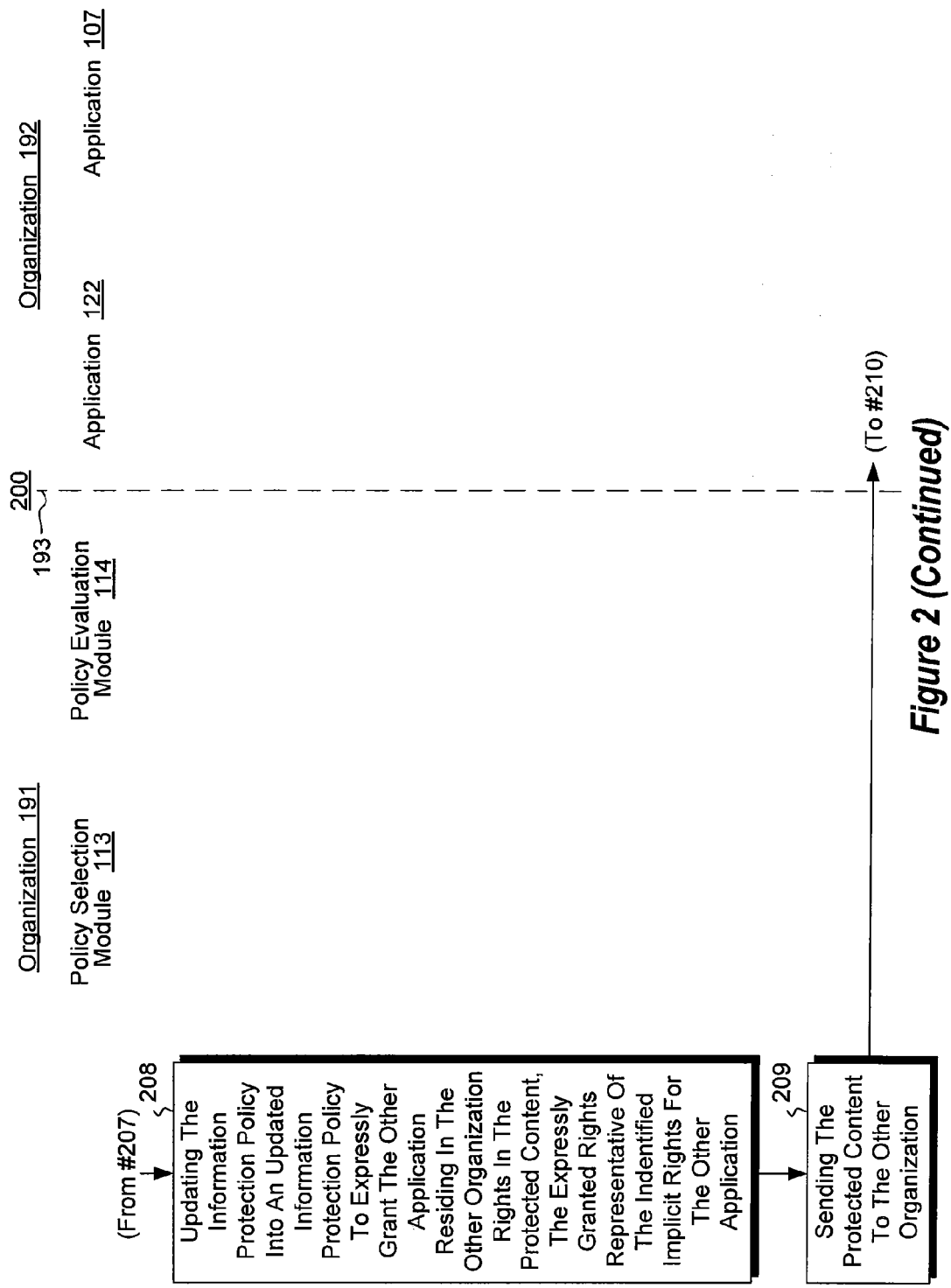

DERIVING EXPRESS RIGHTS IN PROTECTED CONTENT

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In many computing environments, a Rights Management System ("RMS") is used to protect information. Information protection can include a provisioning process for each participating principal. The provisioning process consists of the authentication and identification of a principal, and the generation and storage cryptographic key for him/her. The principal's identification and cryptographic key are statically bound together as identity certificate. The identity certificate is signed by an information protection authority, making it tamper resistant. The identity certificate is distributed to the principal for publishing and consuming content. The identity certificate is often associated with policy enforcement software.

Information protection can also include publishing protected information. During the creation of protected information, a usage policy is specified. The usage policy describes a set of principals and the types of access they have. A usage policy typically includes a content key that is used to encrypt the protected information.

To obtain access to protected information, a recipient's identity certificate and the protected information's usage policy are submitted to an authorization server. The authorization server evaluates the identification information in the identity certificate against the usage policy to determine whether the recipient is authorized to access the content, what types of access the recipient has and under what conditions. If the recipient is granted to any permission, a usage license is issued. The cryptographic key inside of the identity certificate is used to encrypt the granted accesses and the content key encrypting the protected information.

The usage license is bound to the cryptographic key contained in the identity license on recipient side. The protected information is decrypted. The granted accesses and conditions are enforced.

One challenge for information protection systems is the ability for applications to be able to process protected content for usage scenarios, such as, for example, archival, hygiene, search, etc., that rely on an application to have rights to the content in addition to a user. Within an enterprise, this is facilitated by an administrator managing implicit rights for applications. However, when collaborating between enterprises the management of implicit rights becomes more difficult since there is often no trust defined between two enterprises.

Improperly managed implicit rights can result in feature impairment. For example, protected information cannot be easily exchanged between two or more organizations since administrators can choose to reject protected content. Rejecting content can impede the end-users ability to get their tasks completed.

Improperly managed implicit rights can also result in information disclosure. Typically when the recipient of the protected information is unable to view the content, for example, due to another application rejecting the content, the recipient requests an unprotected copy of the content. Use of an unprotected copy of content can lead to information disclosure whether by accident or intentionally. Information disclosure can have a substantial impact (financial, damaged imaged, etc.) to the owner of the content that should have been protected.

BRIEF SUMMARY

The present invention extends to methods, systems, and computer program products for deriving express rights in protected content. In some embodiments, rights in protected content are expressly assigned to an application in another organization. An information protection policy is formulated for a portion of content residing within the organization. The information protection policy grants rights in the protected content to an entity in the other organization. It is determined that the protected content is to be delivered outside of the organization.

Implicit rights that another application in the other organization has in the protected content are identified based at least in part on the formulated information protection policy for the protected content. The information protection policy is updated into an updated information protection policy to expressly grant the other application rights in the protected content, the expressly granted rights representative of the indentified implicit rights for the other application. The protected content is sent to the other organization.

In other embodiments, protected content from an entity in another organization is accessed. An organization application receives protected content from the other organization. The organization application sends a request for rights to the protected content to the other organization. The organization application receives expressly granted rights in the protected content from the other organization. The expressly granted rights are included in an information protection policy within the other organization. The expressly granted rights are representative of implied rights identified for the organization application within the other organization. The implied rights identified within the other organization are based at least in part on the information protection policy for the protected content. The information protection policy for the protected content is updated to include the expressly granted rights.

The organization application takes one or more actions on the protected content in accordance with the expressly granted rights. The organization application forwards the protected content to the user application. The user application sends a request for rights to the protected content to the other organization. The user application receives granted rights in the protected content from the other organization. The granted rights are expressly provided to the user application in the information protection policy within the other organization.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
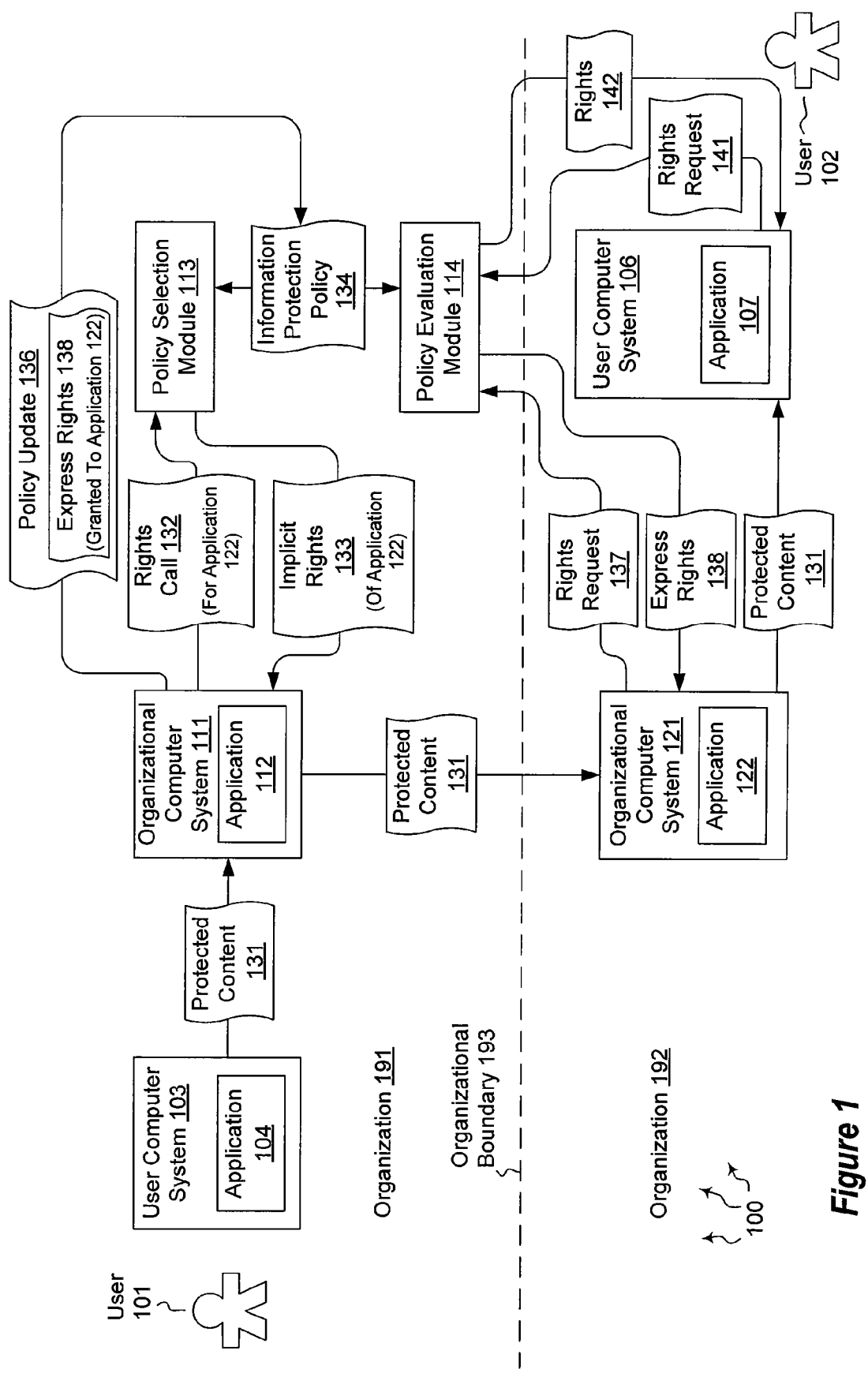
FIG. 1 illustrates an example computer architecture that facilitates deriving and enforcing express rights in protected content.

The present invention extends to methods, systems, and computer program products for deriving express rights in protected content. In some embodiments, rights in protected content are expressly assigned to an application in another organization. An information protection policy is formulated for a portion of content residing within the organization. The information protection policy grants rights in the protected content to an entity in the other organization. It is determined that the protected content is to be delivered outside of the organization.

Implicit rights that another other application in the other organization has in the protected content are identified based at least in part on the formulated information protection policy for the protected content. The information protection policy is updated into an updated information protection policy to expressly grant the other application rights in the protected content, the expressly granted rights representative of the indentified implicit rights for the other application. The protected content is sent to the other organization.

In other embodiments, protected content from an entity in another organization is accessed. An organization application receives protected content from the other organization. The organization application sends a request for rights to the protected content to the other organization. The organization application receives expressly granted rights in the protected content from the other organization. The expressly granted rights are included in an information protection policy within the other organization. The expressly granted rights are representative of implied rights identified for the organization application within the other organization. The implied rights identified within the other organization based at least in part on the information protection policy for the protected content. The information protection policy for the protected content is updated to include the expressly granted rights.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture that facilitates deriving and enforcing express rights in protected content. Referring to FIG. 1, computer architecture 100 includes user computer system 103, user computer system 106, organizational computer system 111, policy selection module 113, policy evaluation module 114, and organizational computer system 121. Each of the depicted computer systems and components can be connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, organizational boundary 193 separates organization 191 (e.g., one enterprise) and organization 192 (another enterprise) from one another. Organization 191 and organization 192 can be separately controlled. As such, an administrator for organization 191 can control user computer system 103, application 104, organization computer system 111, application 112, policy selection module 113, and policy evaluation module 114. Another different administrator for organization 192 can control user computer system 106, application 107, organization computer system 121, and application 122.

Trust between components in organization 191 and components in organization 192 can be less than the trust between a first component and a second component within organization 191 and less than the trust between a first component and a second component within organization 192. The level of trust between organization 191 and organization 192 can be defined within organization 191 and/or organization 192. Alternately, trust can be defined in some other location external to both organization 191 and organization 192.

Trust between organization 191 and organization 192 can be symmetric That is, organization 191 trusts organization 192 similarly (or even the same) as organization 192 trusts organization 191. Alternately, trust between organization 191 and organization 192 can be asymmetric. That is, organization 191 can trust organization 192 more than organization 192 trusts organization 191 or vice versa. In some embodiments, there is no trust between organization 191 and organization 192

From time to time, a user in organization 191 may desire to exchange protected content with a user in organization 192 or vice versa.

Figure 2:
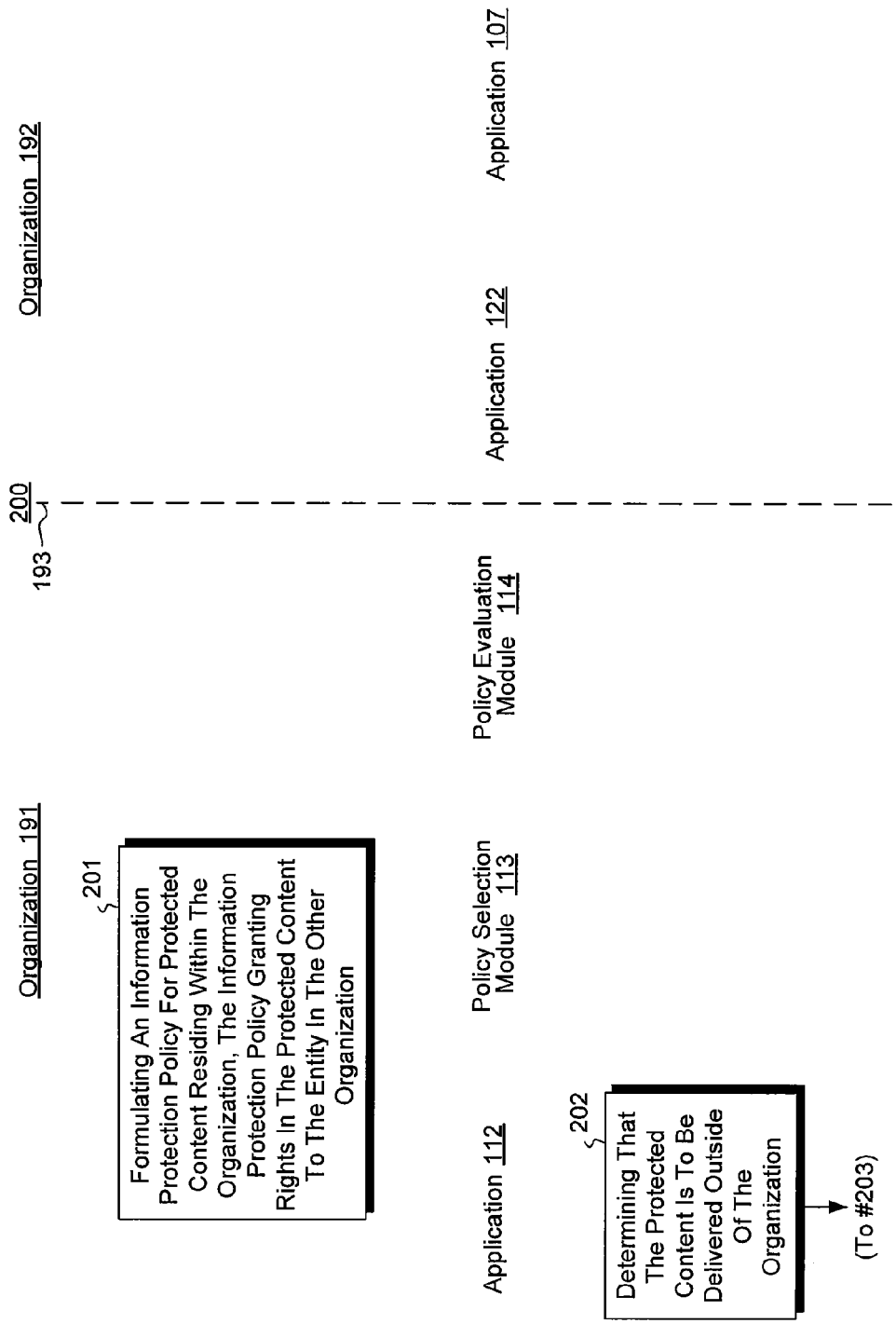
FIG. 2 illustrates a flow chart of an example method for deriving and enforcing express rights in protected content.
Figure 2:
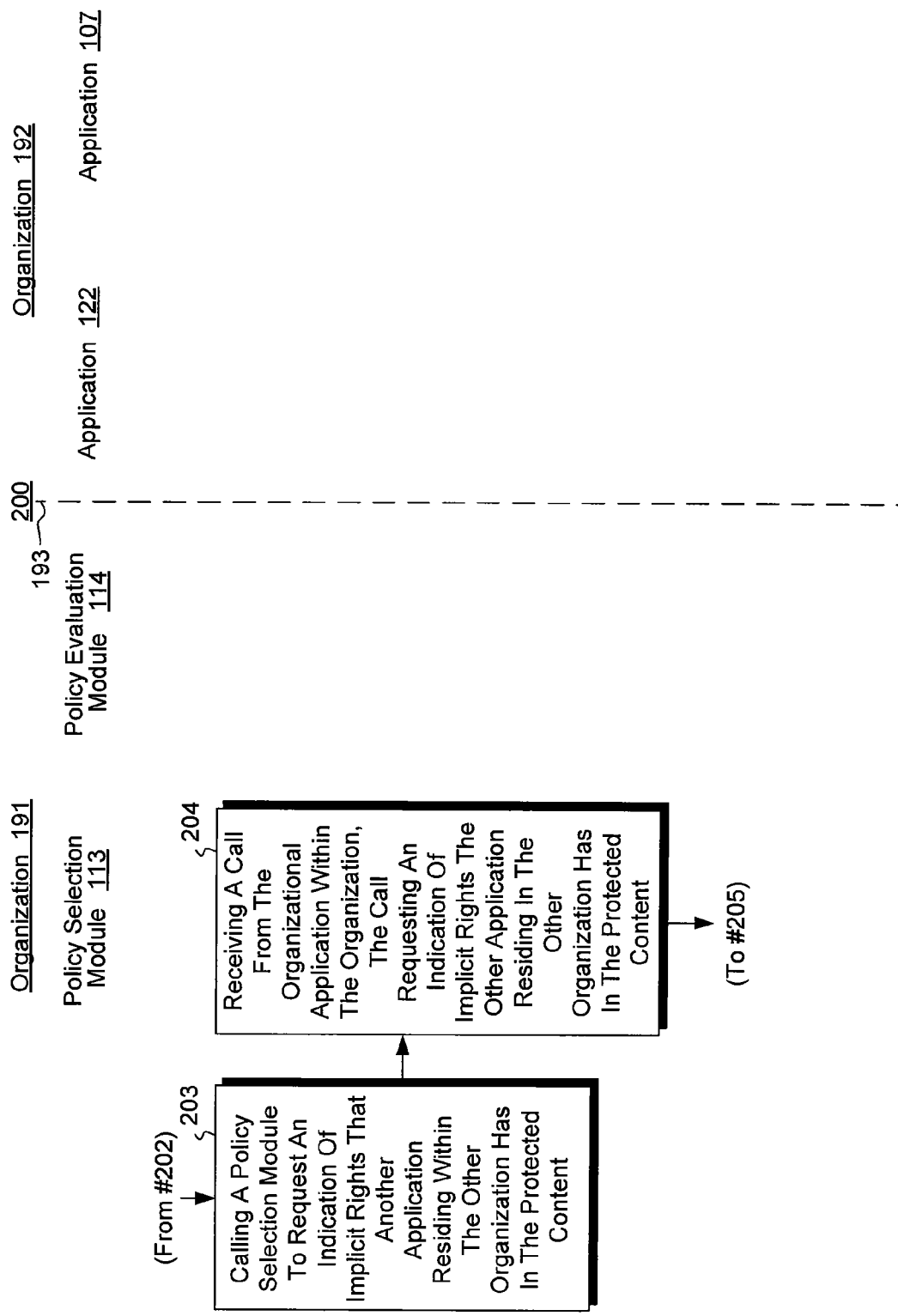
Figure 2:
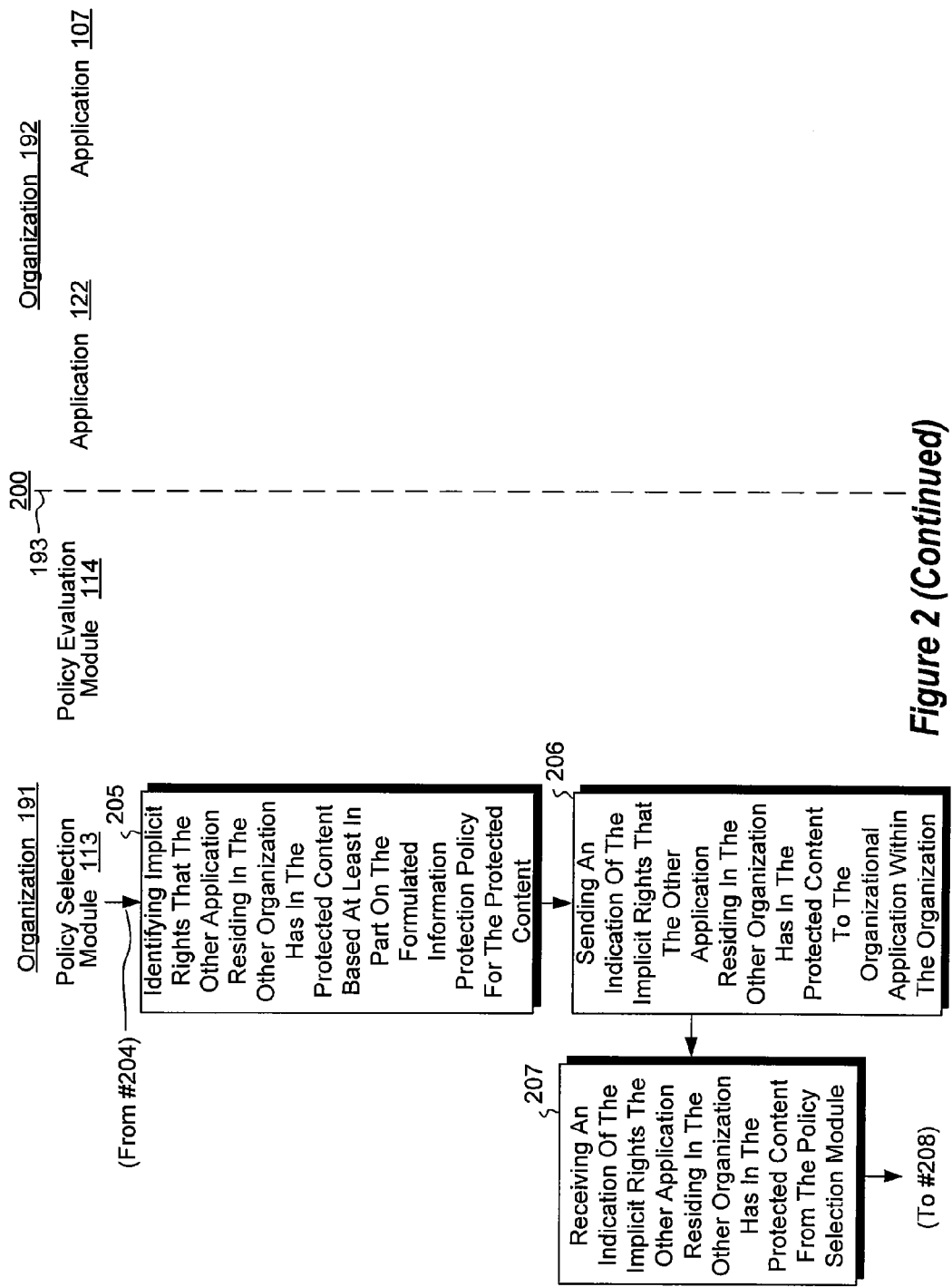
Figure 2:
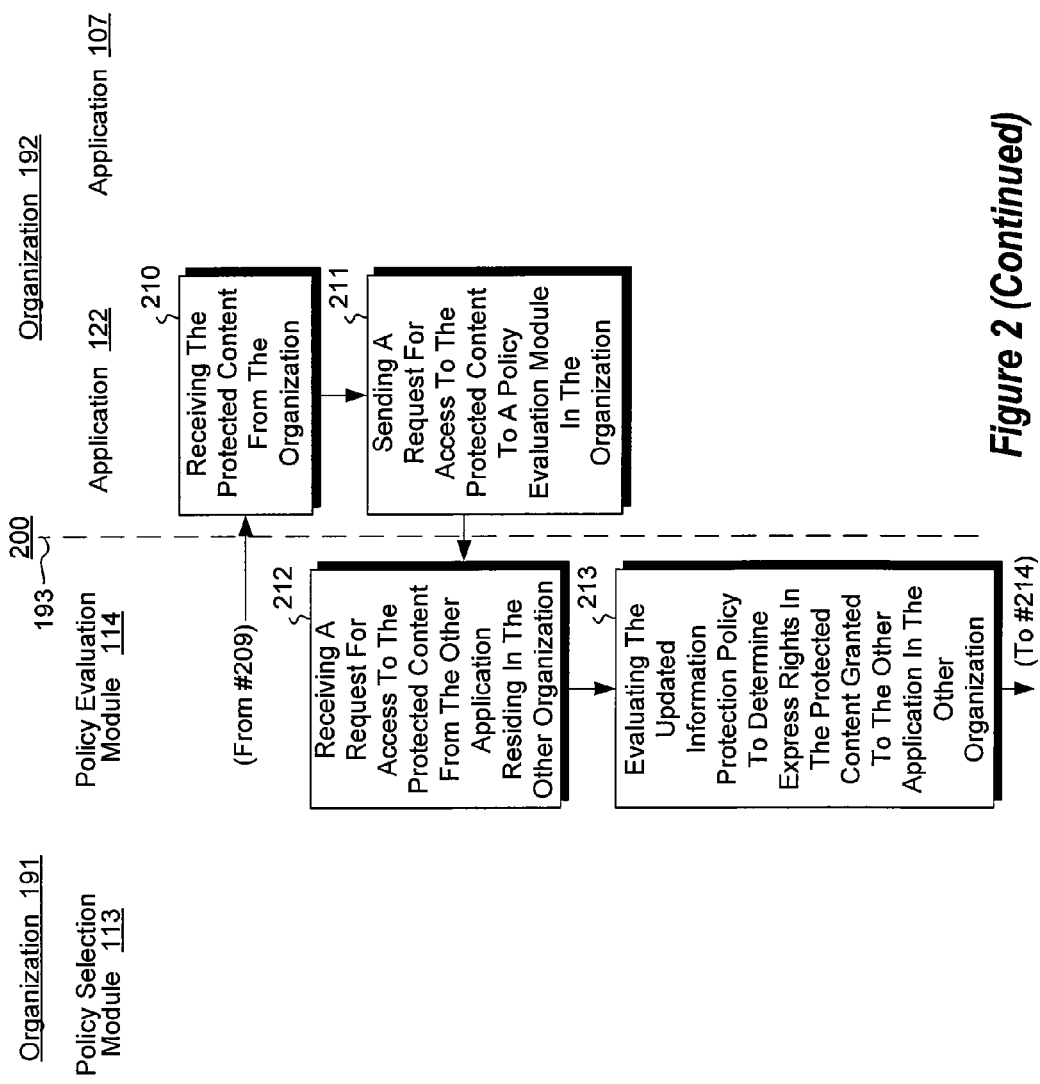
Figure 2:
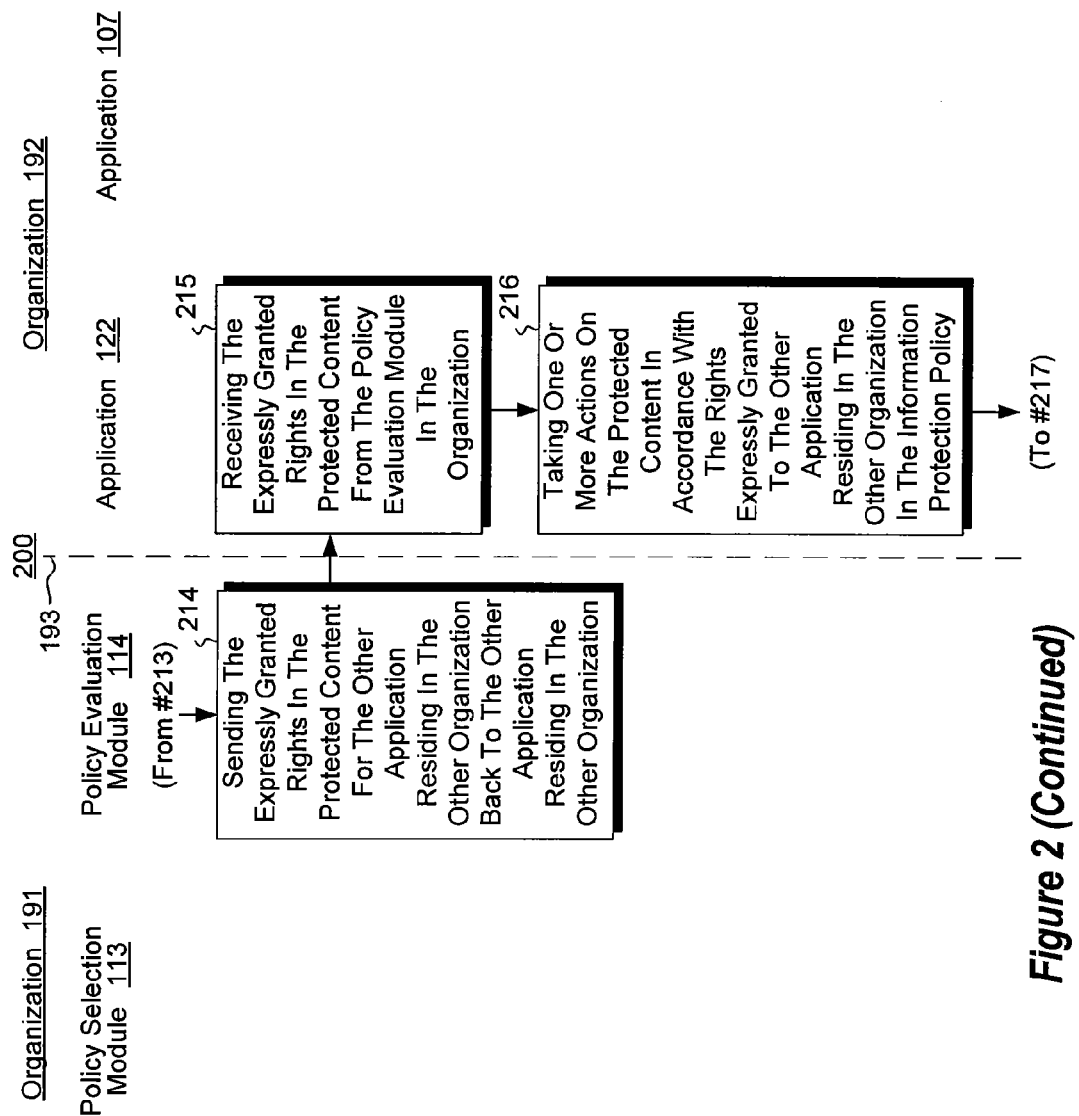
Figure 2:
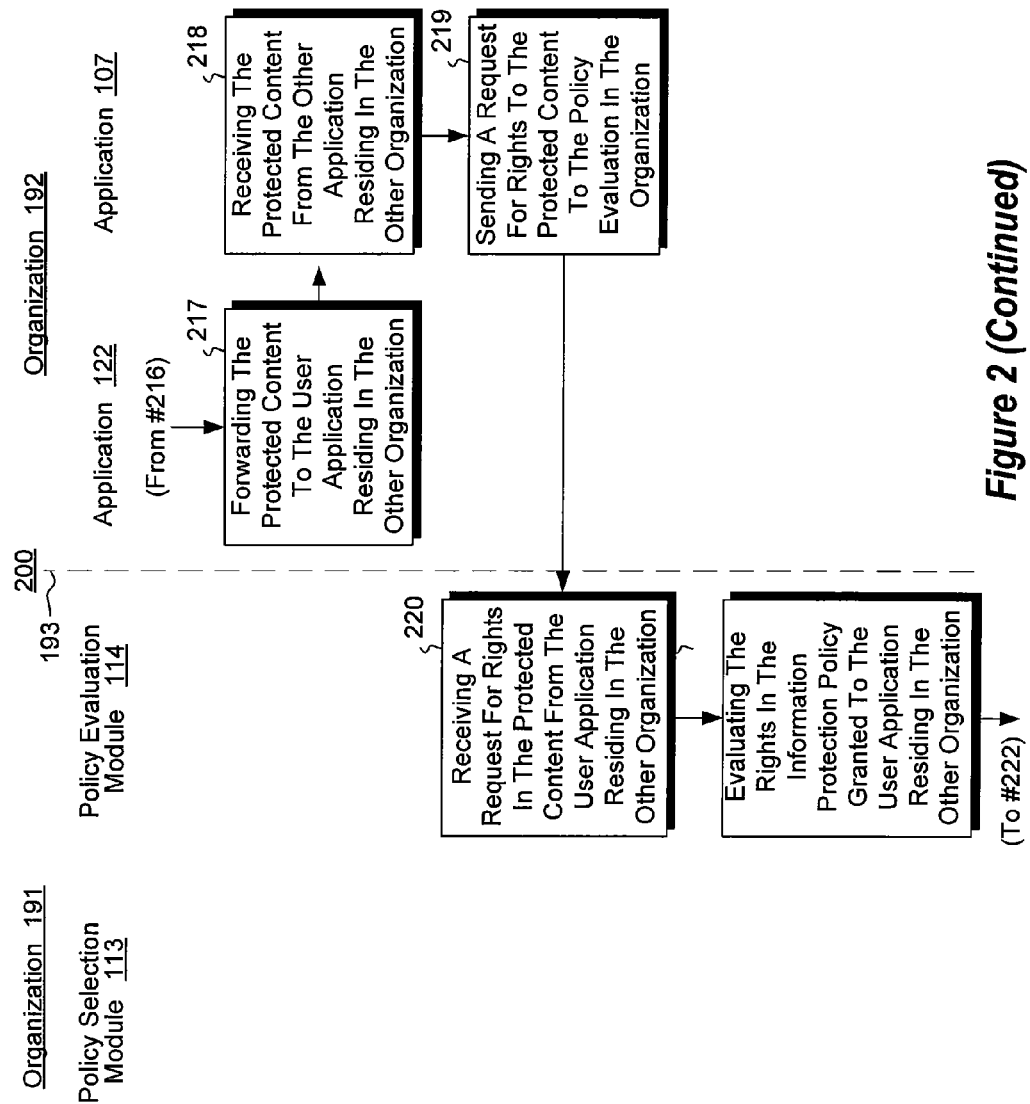
Figure 2:
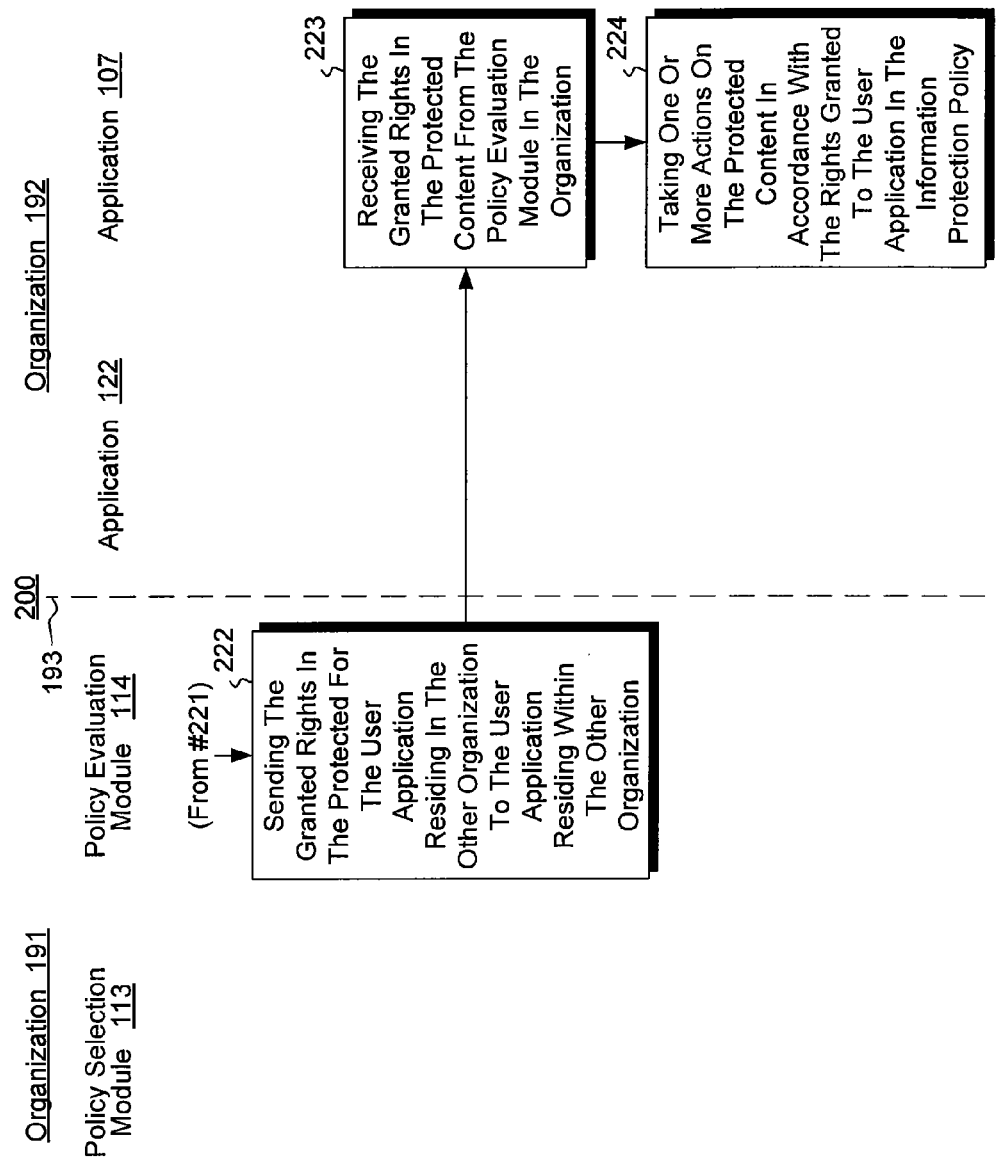

FIG. 2 illustrates a flow chart of an example method 200 for deriving and enforcing express rights in protected content. Method 200 will be described with respect to the components and data of computer architecture 100.

Method 200 includes an act of formulating an information protection policy for protected content residing within the organization, the information protection policy granting rights in the protected content to the entity in the other organization (act 201). For example, user 101 can publish protected content 131 and define rights to protected content 131 in information protection policy 134. Information protection policy 134 can grant rights 142 in protected content 131 to application 107 and/or user 102.

Subsequently, user 101 can use application 104 to send protected content 131 to user 102. On a path from computer system 103 to computer system 106, protected content 131 can be received at organizational computer system 111 (e.g., an outbound server within organization 191).

Method 200 includes an act of an organization application within the organization determining that the protected content is to be delivered outside of the organization (act 202). For example, application 112 can determine that protected content 131 is to be delivered to user 102 in organization 192. Method 200 includes an act of the organization application within the organization calling a policy selection module to request an indication of implicit rights that another application residing within the other organization has in the protected content (act 203). For example, application 112 can issue rights call 132 to policy selection module 113 in response to determining that protected content 131 is to be delivered to organization 192. Rights call 132 can request an indication of implicit rights that application 122 has in protected content 131.

Method 200 includes an act of the policy selection module receiving a call from the organizational application within the organization, the call requesting an indication of implicit rights the other application residing in the other organization has in the protected content (act 204). For example, policy selection module 113 can receive rights call 132 from application 112 in response to determining that protected content 131 is to be delivered to organization 192.

Method 200 includes an act of the policy selection module identifying implicit rights that the other application residing in the other organization has in the protected content based at least in part on the formulated information protection policy for the protected content (act 205). For example, policy selection module 113 can identify that application 122 has implicit rights 133 in protected content 131 based at least in part on information protection policy 134 in response to determining that protected content 131 is to be delivered to organization 192. Implicit rights include rights that can be implied for one entity based on express rights granted to another entity. Implicit rights also include rights that can be inferred for an entity based on other information.

For example, policy selection module 113 can determine that information protection policy 134 implies that application 122 has rights in protected content 131. That is, rights granted to application 107/user 102 may imply (due at least in part on the relationship between application 122 and application 107/user 102) that application 122 also has some rights in protected content 131. For example, a right granting read/write access in protected content 131 to application 107/user 102 can imply that application 122 at least has the right to transfer protected content 131 to application 107.

In some embodiments, policy selection module 113 includes a heuristic based engine that assists in indentifying implied rights for an entity. The heuristic based engine can infer rights based on levels of trust between organizations 191 and 192, levels of trust between organization 191 and other third parties, and levels of trust between organization 192 and other third parties. Levels of trusts can be considered at an organizational level and/or an application level. In some embodiments, levels of trust can be obtained from external providers that measure trust between entities.

When the heuristic based engine identifies higher levels of trust with common third party entities, the heuristic based engine can infer that granting increased rights in protected content may be appropriate. For example, if organization 191 has a high level of trust in a specified organization and that specified organization in turn has a high level of trust in organization 192, the heuristic based engine may infer that it is relatively safe to grant increased rights in protected content 131 to application 122.

The heuristic based engine can also infer rights for application 122 based on application 107/user 102 being the recipient for protected content 131. For example, heuristic based engine may determine that application 122 is a hygiene application (e.g., for archiving, malware scanning, etc.) that all incoming content for organization 192 passes through. Thus, protected content 131 is to pass through application 122 on its way to application 107/user 102. To avoid application 122 rejecting protected content 131, the heuristic based engine can infer that is relative safe to grant application 122 rights to perform hygiene operations on protected content 131.

Method 200 includes an act of the policy selection module sending an indication of the implicit rights that the other application residing in the other organization has in the protected content to the organizational application within the organization (act 206). For example, policy selection module 113 can send implicit rights 133 to application 112 in response to determining that protected content 131 is to be delivered to organization 192. Method 200 includes an act of the organizational application within the organization receiving an indication of the implicit rights the other application residing in the other organization has in the protected content from the policy selection module (act 207). For example, application 112 can receive implicit rights 133 from policy selection module 113 in response to determining that protected content 131 is to be delivered to organization 192.

Method 200 includes an act of the organizational application within the organization updating the information protection policy into an updated information protection policy to expressly grant the other application residing in the other organization rights in the protected content, the expressly granted rights representative of the indentified implicit rights for the other application (act 208). For example, application 112 can formulate and submit policy update 136 to update information protection policy 134 to grant application 122 express rights 138 in protected content 131 in response to determining that protected content 131 is to be delivered to organization 192. Express rights 138 can be representative of implicit rights 133.

Thus, information protection policy 134 is dynamically updated to grant express rights in protected content 131 to application 122 in response to detecting that protected content 131 is to be sent into organization 192.

Method 200 includes an act of the organizational application within the organization sending the protected content to the other organization (act 209). For example, application 112 can send protected content 131 to organizational computer system 121. Method 200 includes an act of the other application residing in the other organization receiving the protected content from the organization (act 210). For example, application 122 can receive protected content 131 from organizational computer system 111.

Method 200 includes an act of the other application residing in the other organization sending a request for rights in the protected content to a policy evaluation module in the organization (act 211). For example, application 122 can send rights request 137 to policy evaluation module 114.

Method 200 includes an act of the policy evaluation module receiving a request for rights in the protected content from the other application residing in the other organization (act 212). For example, policy evaluation module 114 can receive rights request 137 from application 122. Method 200 includes an act of the policy evaluation module evaluating the updated information protection policy to determine express rights in the protected content granted to the other application in the other organization (act 213). For example, policy evaluation module 114 can evaluate information protection policy 134, in view of policy update 136, to determine that application 122 has been granted express rights 138 in protected content 131. Method 200 includes an act of the policy evaluation module sending the expressly granted rights in the protected content for the other application residing in the other organization back to the other application residing in the other organization (act 214). For example, policy evaluation module 114 can send express rights 138 to application 122.

Method 200 includes an act of the other application residing in the other organization receiving the expressly granted rights in the protected content from the policy evaluation module in the organization (act 215). For example, application 122 can receive express rights 138 from policy evaluation module 114. Method 200 includes an act of the other application residing in the other organization taking one or more actions on the protected content in accordance with the rights expressly granted to the other application residing in the other organization in the information protection policy (act 216). For example, application 122 can take one or more actions (e.g., hygiene activities) on protected content 131 in accordance with express rights 138. Method 200 includes an act of the other application residing in the other organization forwarding the protected content to the user application residing in the other organization (act 217). For example, application 122 can forward protected content 131 to application 107.

Method 200 includes an act of the user application residing in the other organization receiving the protected content from the other application residing in the other organization (act 218). For example, application 107 can receive protected content 131 from organizational application 122. Method 200 includes an act of the user application residing in the other organization sending a request for rights to the protected content to the policy evaluation in the organization (act 219). For example, application 107 can send rights request 141 to policy evaluation module 114.

Method 200 includes an act of the policy evaluation module receiving a request for rights in the protected content from the user application residing in the other organization (act 220). For example, policy evaluation module 114 can receive rights request 141 from application 107. Method 200 includes an act of the policy evaluation module in the organization evaluating the rights in the information protection policy granted to the user application residing in the other organization (act 221). For example, policy evaluation module 114 can evaluate information protection policy 134, in view of policy update 136, to determine that application 107 has been granted rights 142 in protected content 131.

Method 200 includes an act of the policy evaluation module sending the granted rights in the protected for the user application residing in the other organization to the user application residing within the other organization (act 222). For example, policy evaluation module 114 can send rights 142 to user application 107.

Method 200 includes an act of the user application residing in the other organization receiving the granted rights in the protected content from the policy evaluation module in the organization (act 223). For example, user application 107 can receive rights 142 from policy evaluation module 114. Method 200 includes an act of the user application residing in the other organization taking one or more actions on the protected content in accordance with the rights granted to the user application (act 224). For example, application 107 can take one or more actions on protected content 131 (e.g., presenting protected content 131 to user 102) in accordance with rights 142.

Embodiments of the invention are also applicable to applications within the same organization when express rights in protected content are not previously defined for one or more applications that are to access the protected content.

Accordingly, embodiments of the invention provide mechanisms to convert implicit rights to express rights for entities, including applications, inside and outside of an organizational (e.g., enterprise) boundary. The conversion can occur dynamically, based on the information protection policies defined by a policy administrator, granting entities express access to perform tasks on protected content. Dynamic conversion provides entities, such as, applications outside an organizational boundary, with express access to perform tasks on protected content. For example, dynamic conversion can include converting implicit rights, provided to an entity such as an application, into express rights for another entity that is outside of the enterprise boundary.

Dynamic conversion allows policy administrators to retain control over the information protection policy that is applied to entities inside and outside of an organizational boundary. Dynamic conversion also minimizes the configuration an administrator provides in order to grant rights to enable applications to work consistently outside of an organizational boundary.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a network system within an organization, the network system including one or more processors and system memory, the network system also including a user application, an organizational application, a policy selection module, and a policy evaluation module, a method for expressly assigning rights to protected content to an application in another organization, the method comprising:
    an act of formulating an information protection policy for protected content residing within the organization, the information protection policy granting rights in the protected content to an entity in the other organization;
    an act of determining that the protected content is to be delivered to the other organization;
    in response to determining that the protected content is to be delivered to the other organization:
        an act of identifying implicit rights that another application in the other organization has in the protected content based at least in part on the formulated information protection policy for the protected content, the identified implicit rights previously not being expressly granted in the formulated information protection policy; and
        an act of updating the information protection policy into an updated information protection policy to expressly grant the other application rights in the protected content, the expressly granted rights representative of the identified implicit rights for the other application, such that the information protection policy now includes expressly granted rights, not previously expressly granted, which correspond to the identified implicit rights; and
    an act of delivering the protected content to the other organization.

2. The method as recited in claim 1, further comprising:
    an act of receiving a request for rights in the protected content from the other application; and
    an act of sending the expressly granted rights in the protected content for the other application back to the other application.

3. The method as recited in claim 2, wherein the act of receiving a request from the other application for rights to perform one or more tasks on the protected content comprises an act of receiving a request from a hygiene application residing in the other organization.

4. The method as recited in claim 2, further comprising an act of receiving a further request for rights in the protected content from a user application residing in the other organization, the user application being the destination for the protected content, the user application's rights in the protected content having been defined when the information protection policy was formulated.

5. The method as recited in claim 4, wherein the act of identifying implicit rights that the other application in the other organization has in the protected content comprises an act of identifying implied rights that the other application has in the protected content based on a the user application residing in the other organization being the destination for the protected content.

6. The method as recited in claim 1, wherein the act of identifying implicit rights that the other application in the other organization has in the protected content comprises an act of identifying implied rights that the other application has in the protected content based on rights expressly granted to user application in other organization in the information protection policy.

7. The method as recited in claim 1, wherein the act of identifying implicit rights that the other application in the other organization has in the protected content comprises an act of inferring rights that the other application has in the protected content based on a trust relationship between the organization and the other organization.

8. The method as recited in claim 1, wherein the act of identifying implicit rights that the other application in the other organization has in the protected content comprises an act of inferring rights that the other application has in the protected content based on a trust relationships from a third part service provider.

9. The method as recited in claim 1, wherein the act of identifying implicit rights that the other application in the other organization has in the protected content comprises an act of identifying that the other application has implicit rights to perform hygiene activities on the protected content.

10. The method as recited in claim 1, further comprising an act of identifying the other application as an intermediary recipient of the protected content prior to indentifying the implicit rights.

11. At a network system within an organization, the network system including one or more processors and system memory, the organization including an organization application and a user application, the organization connected to another organization, the organization and the other organization separated by an organizational boundary, a method of accessing protected content sent from an entity in the other organization, the method comprising:
    an act of the organization application receiving protected content from the other organization;
    an act of the organization application sending a request for rights to the protected content to the other organization;
    an act of the organization application receiving expressly granted rights in the protected content from the other organization, the expressly granted rights included in an information protection policy within the other organization, the expressly granted rights are representative of implied rights identified for the organization application within the other organization, the identified implicit rights previously not having been expressly granted in the information protection policy, the implied rights being identified within the other organization based at least in part on the information protection policy for the protected content, the information protection policy for the protected content updated to include the expressly granted rights, such that the information protection policy now includes expressly granted rights, not previously expressly granted, which correspond to the identified implicit rights;
    an act of the organization application taking one or more actions on the protected content in accordance with the expressly granted rights; and
    an act of forwarding the protected content to the user application.

12. The method as recited in claim 11, further comprising:
    an act of the user application sending a request for rights to the protected content to the other organization;
    an act of the user application receiving granted rights in the protected content from the other organization, the granted rights expressly provided to the user application in the information protection policy; and
    an act of the user application taking one or more action on the protect content in accordance with granted rights expressly provided to the user application.

13. The method as recited in claim 11, wherein the act of the organization application receiving protected content from the other organization comprising an act of the organization application receiving protected content as an intermediary recipient during delivery of the protected content to the user application.

14. The method as recited in claim 13, wherein the act of the organization application receiving expressly granted rights in the protected content from the other organization comprises an act of receiving expressly granted rights representative of implicit rights implied for the organization application based on the user application being the destination for the protected content.

15. The method as recited in claim 13, wherein the act of the organization application receiving expressly granted rights in the protected content from the other organization comprises an act of receiving expressly granted rights representative of implicit rights implied for the organization application based on the express rights granted to the user application in the information protection policy.

16. The method as recited in claim 11, wherein the act of the organization application receiving protected content from the other organization comprising an act of a hygiene application receiving the protected content; and
    wherein the act the organization application taking one or more actions on the protected content in accordance with the expressly granted rights comprises an act of the hygiene application performing one or more hygiene activities on the protected content.

17. The method as recited in claim 11, wherein the act of the organization application receiving expressly granted rights in the protected content from the other organization comprises an act of receiving expressly granted rights representative of implicit rights inferred for the organization application based on a trust relationship between the organization and the other organization.

18. The method as recited in claim 11, wherein the act of the organization application receiving expressly granted rights in the protected content from the other organization comprises an act of receiving expressly granted rights representative of implicit rights inferred for the organization application based on an indication of trust relationships received from a third party service provider.

19. A system within an organization for dynamically updating expressly granted rights in protected content, the system comprising:
    one or more processors;
    system memory; and
    one or more computer storage media having stored thereon computer-executable instructions representing a user application, an organization application, a policy selection module, and a policy evaluation module, the user application, the organization application, the policy selection module, and the policy evaluation module all running within the organization, wherein the user application, when executed upon the one or more processors, is configured to:
    publish protected content;
    publish an information protection policy for the content, the information protection policy expressly defining rights in the protected content for a receiving application; and
    send the protected content to the receiving application;
    wherein the organization application is configured to:
        receive the protected content in route to the receiving application;
        identify any intermediary applications in a path between the organization application and the receiving application that are to receive the content;
        for each intermediary application:
            call the policy selection module to request an indication of implicit rights that the intermediary application has in the protected content;
            receive an indication of the implicit rights the intermediary application has in the protected content from the policy selection module, the implicit rights previously not having been expressly granted in the information protection policy;
            update the information protection policy into an updated information protection policy to expressly grant the intermediary application rights in the protected content, the expressly granted rights representative of the identified implicit rights for the intermediary application, such that the information protection policy now includes expressly granted rights, not previously expressly granted, which correspond to the implicit rights; and forward the protected content to an appropriate intermediary application wherein the organization application is configured to:
for each intermediary application:
receive a call from the organizational application within the organization, the call requesting an indication of implicit rights the intermediary application has in the protected content;
identify implicit rights that the intermediary application has in the protected content based at least in part on the formulated information protection policy for the protected content; and
send an indication of the implicit rights that the intermediary application has in the protected content to the organizational application wherein the policy evaluation module is configured to:
receive requests for rights in the protected content from intermediary applications;
evaluate the updated information protection policy to determine express rights in the protected content granted to the intermediary applications; and
send the expressly granted rights in the protected content for the intermediary applications to the intermediary applications.

20. The system as recited in claim 19, wherein the policy selection module include a heuristic based engine, heuristic based engine configured to:
imply rights for intermediary applications from express rights in the protected content granted to the receiving application, imply rights for intermediary applications based on the receiving application being the destination for the protected content, infer rights for intermediary applications from trust relationships associated with the organization.

* * * * *